US010957918B2

(12) United States Patent
Hilmi et al.

(10) Patent No.: US 10,957,918 B2
(45) Date of Patent: Mar. 23, 2021

(54) STABLE ELECTROLYTE MATRIX FOR MOLTEN CARBONATE FUEL CELLS

(71) Applicant: FuelCell Energy, Inc., Danbury, CT (US)

(72) Inventors: Abdelkader Hilmi, Bethel, CT (US); Arun Surendranath, Danbury, CT (US); Chao-Yi Yuh, New Milford, CT (US); Mohammad Farooque, Marlboro, NJ (US)

(73) Assignee: FuelCell Energy, Inc., Danbury, CT (US)

( * ) Notice: Subject to any disclaimer, the term of this patent is extended or adjusted under 35 U.S.C. 154(b) by 0 days.

(21) Appl. No.: 16/938,281

(22) Filed: Jul. 24, 2020

(65) Prior Publication Data

US 2020/0358111 A1  Nov. 12, 2020

Related U.S. Application Data

(62) Division of application No. 15/343,864, filed on Nov. 4, 2016, now Pat. No. 10,756,358.

(51) Int. Cl.
*H01M 8/0295* (2016.01)
*H01M 8/14* (2006.01)

(52) U.S. Cl.
CPC ......... *H01M 8/0295* (2013.01); *H01M 8/145* (2013.01); *H01M 2008/147* (2013.01); *H01M 2300/0051* (2013.01); *H01M 2300/0091* (2013.01); *Y02E 60/50* (2013.01)

(58) Field of Classification Search
CPC combination set(s) only.
See application file for complete search history.

(56) References Cited

U.S. PATENT DOCUMENTS

| 5,795,671 | A | 8/1998 | Nirasawa et al. |
| 5,827,495 | A | 10/1998 | Tomimatsu et al. |
| 6,037,076 | A | 3/2000 | Tomimatsu et al. |
| 2004/0062981 | A1 | 4/2004 | Friedrich |
| 2006/0110654 | A1 | 5/2006 | Bednarz et al. |

(Continued)

FOREIGN PATENT DOCUMENTS

| WO | WO-2007/011153 A1 | 1/2007 |
| WO | WO-2015/114840 | 8/2015 |

OTHER PUBLICATIONS

Huang et al., Formation Mechanism of {0001} ZnO Epitaxial Layer on -LiAlO2(100) Substrate by Chemical Vapor Deposition, Journal of the Electrochemical Society, 2011, vol. 158(1), pp. H38-H43.

(Continued)

*Primary Examiner* — Christopher P Domone
(74) *Attorney, Agent, or Firm* — Foley & Lardner LLP

(57) ABSTRACT

A method of making an electrolyte matrix includes: preparing a slurry comprising a support material, a coarsening inhibitor, an electrolyte material, and a solvent; and drying the slurry to form an electrolyte matrix. The support material comprises lithium aluminate, the coarsening inhibitor comprises a material selected from the group consisting of $MnO_2$, $Mn_2O_3$, $TiO_2$, $ZrO_2$, $Fe_2O_3$, $LiFe_2O_3$, and mixtures thereof, and the coarsening inhibitor has a particle size of about 0.005 μm to about 0.5 μm.

13 Claims, 6 Drawing Sheets

(56) References Cited

U.S. PATENT DOCUMENTS

| | | | |
|---|---|---|---|
| 2011/0287333 A1* | 11/2011 | Shin | H01M 8/145 429/478 |
| 2015/0214564 A1 | 7/2015 | Hilmi et al. | |
| 2016/0347623 A1* | 12/2016 | Fukazawa | C01F 7/043 |
| 2018/0145363 A1* | 5/2018 | Surendranath | H01M 4/9033 |

OTHER PUBLICATIONS

Gallino et al., Band gap engineering of bulk ZrO2 by Ti doping, Phys. Chem. Chem. Phys., 2011, vol. 13, pp. 17667-17675.

Final Office Action dated Feb. 26, 2020 in U.S. Appl. No. 15/343,864.

Final Office Action dated Dec. 12, 2018 in U.S. Appl. No. 15/343,864.

Finn, P.A, The Effects of Different Environments on the Thermal Stability of Powdered Samples of LiAlO2, J. Electrochem. Soc. 1980 127(1): 236-238.

International Preliminary Report on Patentability for PCT/US2017/049888 dated May 16, 2019 (6 pages).

Kim et al., Phase and microstructure stabilities of LiAlO2 in molten Li/Na carbonate for molten carbonate fuel cells, J. Power Sources 143 (2005) 24-29.

Murai et al, Crystal Growth of γ-Lithium Aluminate in Molten Li/K Carbonates, J. Electrochem. Soc., (1996), 143 (9), 2776-2783.

Non-Final Office Action dated Oct. 2, 2019 in U.S. Appl. No. 15/343,864.

Notice of Allowance dated Apr. 23, 2020 in U.S. Appl. No. 15/343,864.

Sotouchi H et al., "Mechanism of Crystal Growth of Lithium Aluminate Particles in Molten Lithium and Potassium Carbonates," J. Electrochem. Soc. 139 (4) (1992) 1127.

Terada et al, Stability and solubility of electrolyte matrix support material for molten carbonate fuel cells, Journal of Power Sources, (1999), 83, 227-230).

Terada et al., Stability of LiAlO2 as electrolyte matrix for molten carbonate fuel cells, Journal of Power Sources 75 (1998) 223-229.

U.S. Office Action dated Mar. 28, 2018 in U.S. Appl. No. 15/343,864.

Yasumoto et al., "Particle growth behaviour of LiAlO2 containing ZrO2 in Li/Na carbonate electrolytes," Journal of Power Sources 71 (1998) 159-163.

* cited by examiner

STABLE ELECTROLYTE MATRIX FOR MOLTEN CARBONATE FUEL CELLS

STATEMENT OF GOVERNMENT RIGHTS

This invention was made with U.S. Government support under Energy Efficiency & Renewable Energy Award No. DE-EE0006606 awarded by the Department of Energy. The U.S. government has certain rights in this invention.

CROSS REFERENCE TO RELATED APPLICATIONS

The present application claims the benefit of U.S. patent application Ser. No. 15/343,864, filed Nov. 4, 2016, which is hereby incorporated by reference herein in its entirety.

BACKGROUND

The present disclosure relates to matrices for supporting an electrolyte in a molten carbonate fuel cell.

Molten carbonate fuel cells (MCFC) are of great interest for power generation, due to their high efficiency and clean conversion of chemical energy into electric energy. Generally carbonate fuel cells operate at intermediate temperatures (575° C.-650° C.) and employ carbonaceous fuels containing carbon dioxide and carbon monoxide. A typical carbonate fuel cell assembly may include a porous Ni anode stabilized against sintering by Cr and/or Al additives and a porous in-situ oxidized and lithiated NiO cathode. The anode and cathode may be separated by a molten alkali carbonate electrolyte, such as $Li_2CO_3/K_2CO_3$ or $Li_2CO_3/Na_2CO_3$, contained within a porous ceramic matrix, such as $LiAlO_2$.

The electrolyte matrix, sandwiched between the electrodes, serves to isolate the fuel from the oxidant, store electrolyte, and facilitate ionic transport. The electrolyte matrix may be a micro-porous ceramic structure that retains a liquid electrolyte by capillary force. An $LiAlO_2$ powder ($\alpha$ or $\gamma$-phase) is a common material used as a basic matrix support. During the operation of a MCFC, the capacity of the matrix to hold electrolyte by capillary force may be altered due to a change in the properties of the $LiAlO_2$ particles that make up the matrix. Several studies have shown the growth of $LiAlO_2$ particles during long term cell operation, leading to the formation of large pores with a size greater than 0.6 µm. This growth produces a decrease in the electrolyte retention ability of the matrix, which may increase the electrolyte loss rate and gas cross-over negatively impacting the cell performance. Thus, it would be advantageous to provide an electrolyte matrix with an enhanced stability that increases cell life and maintains stable cell performance.

SUMMARY

In certain embodiments, an electrolyte matrix is provided. The electrolyte matrix includes a support material comprising lithium aluminate, an electrolyte material comprising lithium carbonate, and a coarsening inhibitor. The coarsening inhibitor comprises $MnO_2$, $Mn_2O_3$, $TiO_2$, $ZrO_2$, $Fe_2O_3$, $LiFe_2O_3$, or mixtures thereof, and the coarsening inhibitor has a particle size of about 0.005 nm to about 0.5 µm.

In one aspect, the coarsening inhibitor that has a BET surface area of about 10 $m^2$/g to about 50 $m^2$/g.

In one aspect, the coarsening inhibitor has a BET surface area of about 20 $m^2$/g to about 40 $m^2$/g.

In one aspect, the coarsening inhibitor has a BET surface area greater than or equal to the BET surface area of the support material.

In one aspect, the support material has a surface area of about 10 $m^2$/g to about 24 $m^2$/g.

In one aspect, the coarsening inhibitor is present in an amount of about 0.1 vol. % to about 40 vol. % of the electrolyte matrix.

In one aspect, the electrolyte matrix further comprises a binder.

In one aspect, the electrolyte matrix further comprises a reinforcing material.

In one aspect, the coarsening inhibitor has a different crystal structure than the support material.

In aspect, the electrolyte matrix is substantially free of pores with a size of 0.6 µm or greater.

In other embodiments, a method for making an electrolyte matrix is provided. The method comprises preparing a slurry comprising a support material, a coarsening inhibitor, an electrolyte material, and a solvent, and drying the slurry to form an electrolyte matrix. The support material comprises lithium aluminate. The coarsening inhibitor material comprises $MnO_2$, $Mn_2O_3$, $TiO_2$, $ZrO_2$, $Fe_2O_3$, $LiFe_2O_3$, or mixtures thereof. The coarsening inhibitor has a particle size of about 0.005 µm to about 0.5 µm.

In one aspect, preparing the slurry comprises an attrition milling process that reduces the size of the materials in the slurry.

In one aspect, the method further comprises tape casting the slurry before drying the slurry.

In one aspect, the method further comprises adding a binder, a plasticizer, a reinforcing material, or a combination thereof to the slurry.

In one aspect, the coarsening inhibitor is present in an amount of about 0.1 vol. % to about 40 vol. % of dry components of the slurry.

In other embodiments, an electrolyte matrix is provided. The electrolyte matrix comprising a support material and an electrolyte material comprising lithium carbonate. The support material comprises lithium aluminate and $MnO_2$, $Mn_2O_3$, $TiO_2$, $ZrO_2$, $Fe_2O_3$, $LiFe_2O_3$, or mixtures thereof as a dopant in the lithium aluminate.

In one aspect, the dopant is present in the lithium aluminate in an amount of about 0.1 mol. % to about 15 mol. %.

In one aspect, the support material has a surface area of about 10 $m^2$/g to about 24 $m^2$/g.

In one aspect, the electrolyte matrix further comprises a binder.

In one aspect, the electrolyte matrix further comprises a reinforcing material.

In one aspect, the electrolyte matrix is substantially free of pores with a size of 0.6 µm or greater.

In other embodiments, a method of making an electrolyte matrix is provided. The method comprising forming a mixture of an aluminum containing precursor, a lithium containing precursor, and a dopant precursor; drying the mixture to form a powder; heat treating the powder at a temperature of about 550° C. to about 800° C. for a period of about 6 hours to about 30 hours to form a lithium aluminate including a dopant; preparing a slurry comprising the lithium aluminate including a dopant, an electrolyte material, and a solvent; and drying the slurry to form an electrolyte matrix. The dopant precursor is in oxide or salt form, and the dopant comprises $MnO_2$, $Mn_2O_3$, $TiO_2$, $ZrO_2$, $Fe_2O_3$, $LiFe_2O_3$, or mixtures thereof.

In one aspect, the dopant precursor comprises $MnO_2$, $TiO_2$, $ZrO_2$, $Fe_2O_3$, or mixtures thereof.

In one aspect, the aluminum precursor comprises $Al_2O_3$.

In one aspect, the lithium precursor comprises lithium carbonate.

In one aspect, the method further comprises tape casting the slurry before drying the slurry.

In one aspect, the method further comprises adding a binder, a plasticizer, a reinforcing material, or a combination thereof to the slurry.

In one aspect, the lithium aluminate including a dopant comprises the dopant in an amount of about 0.1 mol. % to about 15 mol. %.

In other embodiments, a fuel cell is provided. The fuel cell comprises any of the electrolyte matrices described herein.

These and other advantageous features will become apparent to those reviewing the disclosure and drawings.

DETAILED DESCRIPTION

Figure 1:
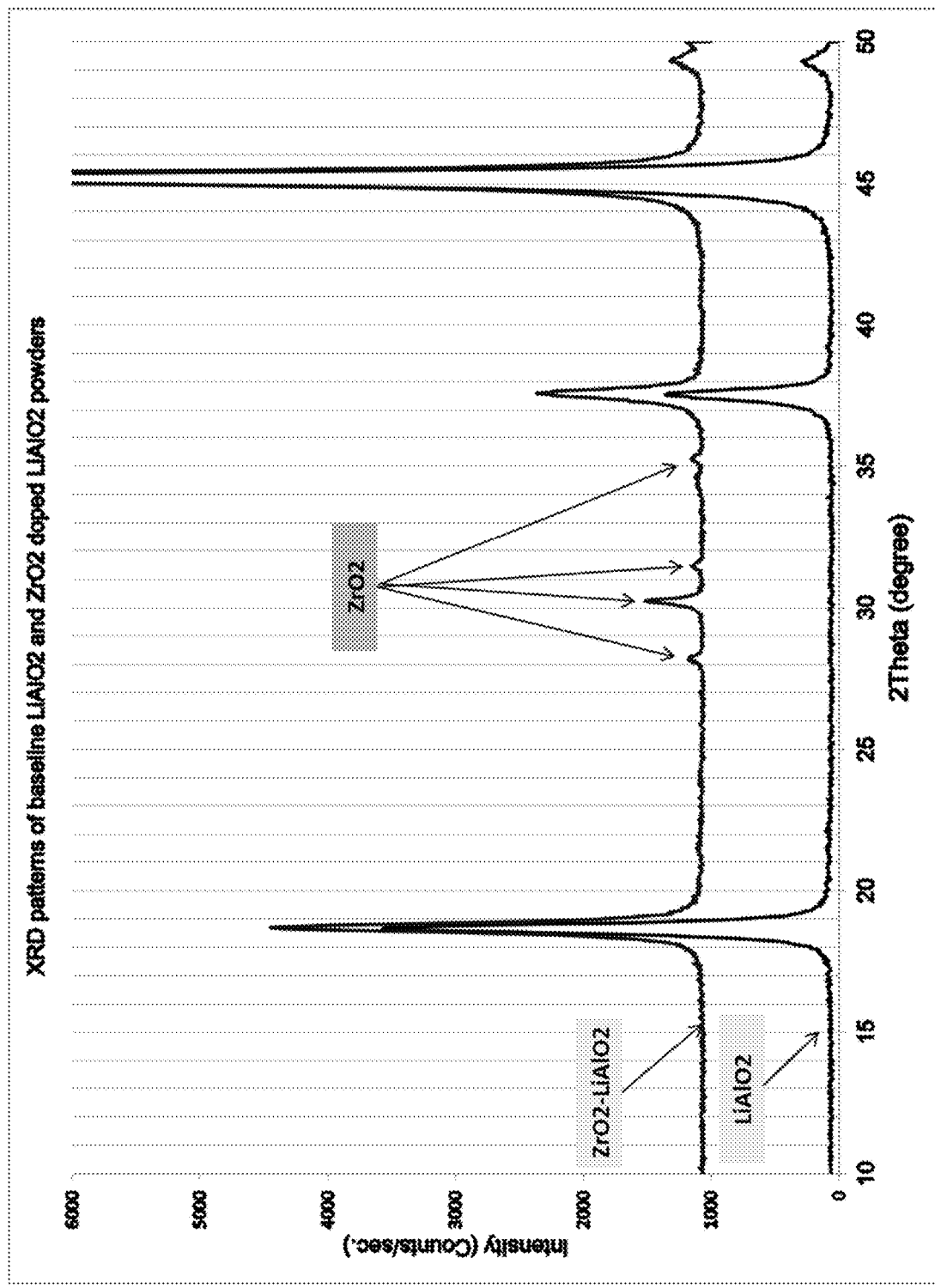
FIG. 1 shows X-Ray Diffraction (XRD) patterns for an $LiAlO_2$ matrix material and a $ZrO_2$ doped $LiAlO_2$ obtained by heat treatment of a mixture of $Zr(OH)_4$, $Al_2O_3$ and $Li_2CO_3$, according to an embodiment of the present invention.

The electrolyte matrices of the present invention exhibit reduced lithium aluminate ($LiAlO_2$) coarsening, thereby maintaining a higher electrolyte retention ability and more consistent performance during operation. The electrolyte matrices achieve this reduced coarsening behavior due at least in part to the presence of a coarsening inhibitor in the electrolyte matrices. The coarsening inhibitor may be present in the form of discrete particles in the electrolyte matrices or as a dopant within a support material of the electrolyte matrices.

The electrolyte matrices are capable of maintaining an appropriate electrolyte fill level over a useful life of at least 5 years. The useful life of an electrolyte matrix may depend on multiple factors, such as the pore sizes present at the beginning of life and the coarsening rate. The electrolyte matrices disclosed herein may have a pore size of less than 0.2 μm at the beginning of life, and a low coarsening rate. The coarsening rate may be influenced by factors including the rates of solubility, diffusion, and precipitation of the $LiAlO_2$.

The particle coarsening of $LiAlO_2$ that occurs during operation of a molten carbonate fuel cell may occur through the Oswald ripening process. The coarsening includes the dissolution and subsequent precipitation of $LiAlO_2$. This coarsening process is diffusion controlled, and may be mitigated by increasing the diffusion distance. One strategy for increasing the diffusion distance includes mixing particles of different crystal structures in the electrolyte matrix, as the dissolved species have a longer distance to travel before encountering a material with the same crystal structure on which they may precipitate.

In one embodiment, a heterogeneous electrolyte matrix material is provided. The heterogeneous matrix material may include a support material and a coarsening inhibitor. Each of the components of the heterogeneous matrix material may be present as discrete particles.

The support material may be any appropriate electrolyte support material, such as $LiAlO_2$. The $LiAlO_2$ support material may be in the γ or α form. The support material may have a Brunauer-Emmett-Teller (BET) surface area of about 10 $m^2/g$ to about 24 $m^2/g$. The support material may have an average particle size of about 0.1 nm to about 100 nm.

The coarsening inhibitor may be any material that has a different crystal structure than the support material and exhibits good stability in a carbonate electrolyte. The coarsening inhibitor may be an oxide material, such as $MnO_2$, $Mn_2O_3$, $TiO_2$, $ZrO_2$, $Fe_2O_3$, $LiFe_2O_3$, or mixtures thereof. The coarsening inhibitor may have an average particle size in the range of about 0.005 μm to about 0.5 μm. The particle size may refer to a diameter or equivalent diameter of the coarsening inhibitor particles. The small average particle size of the coarsening inhibitor enhances the degree of contact between the coarsening inhibitor and the support material. The coarsening inhibitor particles may have any appropriate geometry, such as spherical particles, rounded particles, elongated particles, or irregularly-shaped particles.

The coarsening inhibitor may have a BET surface area that is equal to or greater than the BET surface area of the support material. The BET surface area of the coarsening inhibitor may be about 10 $m^2/g$ to about 50 $m^2/g$, such as about 15 $m^2/g$ to about 50 $m^2/g$, or about 20 $m^2/g$ to about 40 $m^2/g$. In the event that the BET surface area of the coarsening inhibitor is too low, the contact between the coarsening inhibitor and the support material may not be sufficient to produce the desired reduction in the coarsening of the support material.

The coarsening inhibitor may be present in the electrolyte matrix in any amount sufficient to reduce the coarsening of the support material while avoiding negative effects on the performance of the fuel cell. The coarsening inhibitor may be present in the electrolyte matrix in an amount of about 0.1 vol. % to about 40 vol. % of the dry components of the electrolyte matrix, such as about 0.1 vol. % to about 10 vol. %, or about 5 vol. % to about 15 vol. %. The coarsening inhibitor may be present in the electrolyte matrix in an amount of about 1 wt. % to about 40 wt. %, such as about 10 wt. % to about 20 wt. %. In the event that the coarsening inhibitor is too low, the coarsening of the support material may not be reduced. If the coarsening inhibitor content is too high, the performance of the fuel cell may be negatively impacted and the electrolyte chemistry may become too basic.

The electrolyte matrix may optionally include reinforcing materials that serve to increase the compressive strength, crack resistance, and thermal cycle capability of the electrolyte matrix. The reinforcing materials may have any appropriate geometry, such as particles or fibers. Particles of reinforcing material may have a spherical shape, rounded shape, or disk shape. The reinforcing material may be formed of any appropriate composition, such as a metal or oxide material. The reinforcing material may be a coarse material, such as particles with a size of about 10 μm to about 120 µm. In some embodiments, the reinforcing material may include aluminum oxide ($Al_2O_3$).

The electrolyte material may optionally include a binder. The binder may be a sacrificial binder that is removed at high temperatures, such as the conditioning temperatures of a molten carbonate fuel cell. In some embodiments, the binder may include a polymeric material.

The electrolyte present in the electrolyte matrix may include any appropriate carbonate. In some embodiments, the electrolyte may include lithium carbonate ($Li_2CO_3$). The electrolyte may also optionally include sodium carbonate or potassium carbonate.

The electrolyte matrix may be substantially free of large pores. In some embodiments, the electrolyte matrix may be substantially free, or free, of pores with a size greater than or equal to about 0.6 In some other embodiments, the electrolyte matrix may be substantially free, or free, of pores with a size greater than about 0.2 The electrolyte matrix may be substantially free, or free, of pores with a size greater than or equal to about 0.6 µm after operation of a fuel cell. In some embodiments, the pore structure of the electrolyte matrix may be free of pores with a size greater than about 0.2 µm after the burnout of a binder.

The heterogeneous electrolyte matrix may be made by any appropriate process. In some embodiments, a heterogeneous electrolyte matrix may be produced by a process including forming a slurry containing a support material, coarsening inhibitor, electrolyte material, and a solvent. The slurry may then be dried to form the electrolyte matrix. The support material, coarsening inhibitor, and electrolyte material may be any of those described herein. The solvent may be any appropriate solvent, such as methyl ethyl ketone (MEK), or a mixture of MEK, cyclohexane, and fish oil.

The slurry may be formed by an attrition milling process, such as ball milling. The milling process may be continued until a desired particle size is achieved. The grinding media may have a ball size of 0.3 mm to 3 mm, and may have a loading of about 60% to about 80%. The milling speed may be about 2,000 rpm to about 3,000 rpm. After the desired particle size is achieved, optional components may be added to the slurry, such as a reinforcing material, binder, plasticizer, or pore forming material.

The slurry may include the coarsening inhibitor in any appropriate amount. In some embodiments, the coarsening inhibitor may be present in the slurry in an amount of about 0.1 vol. % to about 40 vol. %, such as about 0.1 vol. % to about 10 vol. %, on the basis of the dry components of the slurry.

The slurry may be dried by any appropriate process. In some embodiments, the slurry may be tape cast, such as with a doctor blade, and then dried to form an electrolyte matrix. The drying may take place at a temperature of about 25° C. to about 30° C. for about 30 minutes to about 50 minutes. The dried electrolyte matrix may then optionally cut to a desired size before being installed in a fuel cell.

In another embodiment, the electrolyte matrix may include a homogeneous distribution of support material and dopant. The support material may be lithium aluminate, as described above. The support material may have a size, surface area, and shape as described above. The dopant may be any of the coarsening inhibitors described above. The dopant may be in the form of uniformly distributed fine particles on or near the surface of the support material particles, such as particles with a size of less than about 0.1 µm. The dopant particles may have any appropriate geometry, such as rounded particles, spherical particles, or elongated particles. The dopant may be supported on the support material such that the support material and dopant may act as a single particulate material. In some embodiments, the dopant may be present in the crystal structure of the support material.

The dopant may be present in any amount sufficient to suppress the coarsening of the support material. In some embodiments, the dopant may be present in an amount of about 0.1 mol. % to about 15 mol. % relative to the support material.

The electrolyte matrix may further include optional components. The optional components may include a reinforcing material, binder, plasticizer, or pore forming material as described above. The electrolyte included in the electrolyte matrix may be a carbonate, as described above.

The electrolyte matrix that includes a homogeneous distribution of support material and dopant may be produced by any appropriate process. In some embodiments, dopant precursors made be added to a synthesis mixture for the synthesis of the support material. The synthesis mixture may include aluminum precursors, lithium precursors, and dopant precursors, and may be an aqueous mixture. The synthesis mixture may then be dried to form a powder, and the powder may be heat treated to form a support material including a dopant. The support material including a dopant may then be included in a slurry as described above to form an electrolyte matrix, with the presence of an additional coarsening inhibitor in the slurry being unnecessary. In some embodiments, the support material including a dopant may be formed into an electrolyte matrix that includes a coarsening inhibitor in addition to the dopant.

The aluminum precursors and lithium precursors may be any materials that are capable of forming a lithium aluminate support material, and may be present in amounts appropriate to form a lithium aluminate support material. The aluminum precursors may include aluminum hydroxide, alumina, aluminum isopropoxide, or aluminum isobutoxide, with alumina being preferred. The lithium precursors may include lithium hydroxide, lithium oxide, lithium acetate, or lithium carbonate, with lithium carbonate being preferred.

The dopant precursors may be any precursor capable of forming the desired dopant species. In some embodiments, the dopant precursor may include $MnO_2$, $Mn_2O_3$, $Fe_2O_3$, $TiO_2$, or $ZrO_2$. The dopant precursor may alternatively be salts of manganese, iron, titanium, or zirconium. In some embodiments, the dopant precursor may be a hydroxide, such as zirconium hydroxide.

The synthesis mixture of including the support material precursors and the dopant precursors may be formed by any appropriate process. In some embodiments, the synthesis mixture may be formed by subjecting an aqueous mixture of an aluminum precursor, lithium precursor, dopant precursor, and a dispersant to an attrition milling process. The solid loading of the milled mixture may be about 5 wt. % to about 30 wt. %. The conditions of the attrition milling process may be similar to those described above.

The synthesis mixture may be dried by any appropriate process to form a powder. In some embodiments, the mixture may be spray dried. The mixture may alternatively be dried in air at about 80° C. to about 160° C. for a period of about 6 hours to about 12 hours, such as overnight.

The dried powder may then be subjected to a heat treatment sufficient to form lithium aluminate. The heat treatment may be at about 550° C. to about 800° C., for a period of about 6 hours to about 30 hours. The resulting lithium aluminate includes a uniformly dispersed dopant, in the form of particles with a size of less than 0.1 µm and a BET surface area of at least about 15 $m^2/g$ to about 30 $m^2/g$.

The resulting lithium aluminate may also be doped with a small amount of the metal component of the dopant precursor, such that the lithium aluminate is more stable against phase transformations.

The electrolyte matrices described herein may be employed in any molten carbonate fuel cell. The electrolyte matrices may be disposed between a porous anode and a porous cathode. The porous anode may be nickel stabilized against sintering by the addition of chromium and/or aluminum. The porous cathode may be in-situ oxidized and lithiated nickel oxide.

The electrolyte matrices described herein exhibit improved performance. The electrolyte matrices may reduce particle coarsening and the resulting population of large pores by greater than 60% during cell operation in comparison to equivalent lithium aluminate electrolyte matrices that do not include coarsening inhibitor additives. The electrolyte matrices also do not exhibit a phase transformation under molten carbonate fuel cell operation conditions. The electrolyte matrices also exhibit greater than a 40% improvement in resistance stability compared to a baseline of an electrolyte matrix that does not include a coarsening inhibitor additive. The electrolyte matrices also exhibit improved electrolyte filling compared to a baseline of an electrolyte matrix that does not include a coarsening inhibitor additive, possibly due to an enhanced capillary force.

Exemplary Embodiments

Figure 2A:
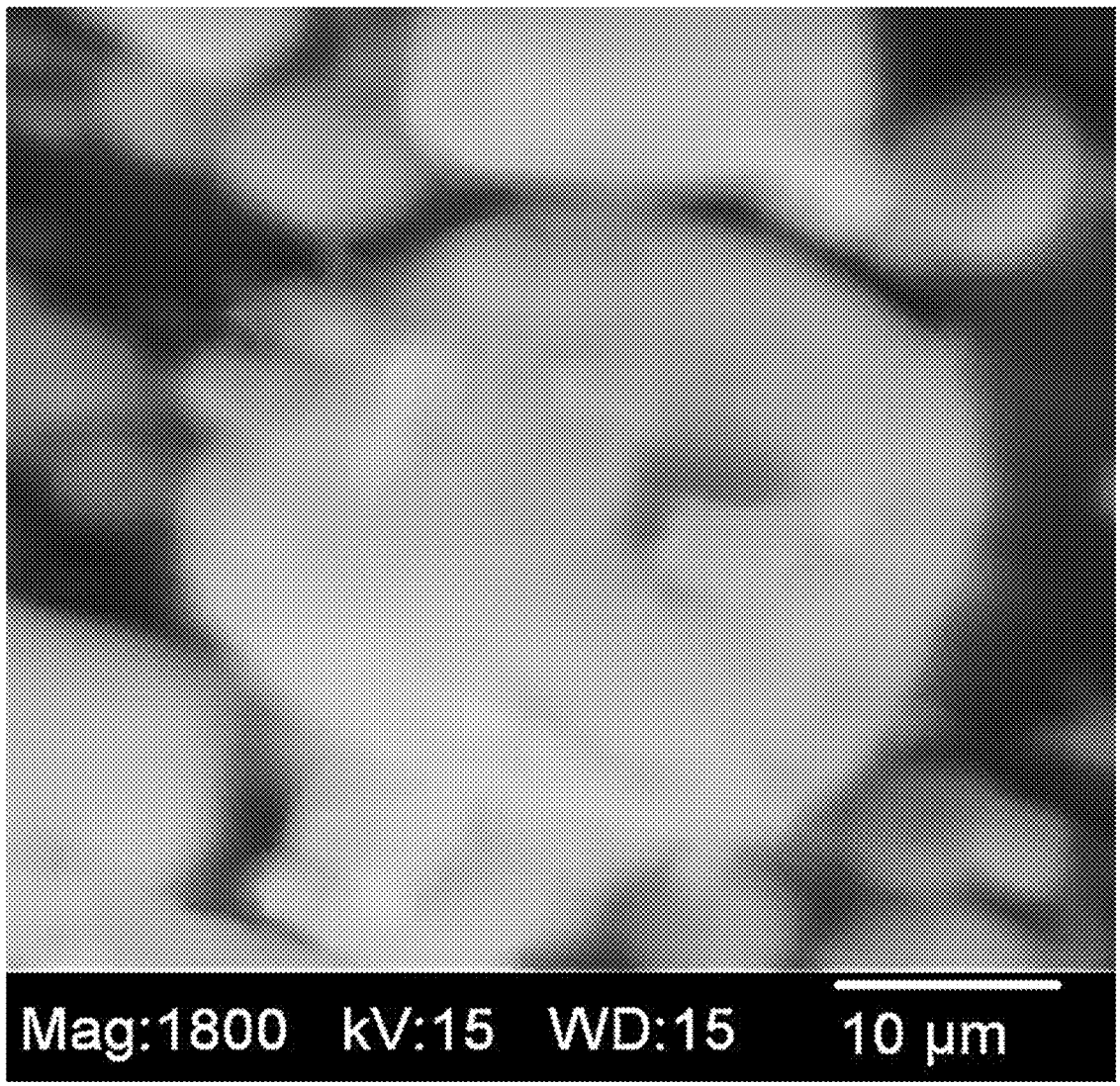
FIG. 2A shows a scanning electron microscope (SEM) image of a $ZrO_2$—$LiAlO_2$ matrix material obtained by heat treatment of a mixture of $Zr(OH)_4$, $Al_2O_3$ and $Li_2CO_3$ at 680° C. to 850° C. for 12 to 30 hours, according to an embodiment of the present invention.
Figure 2B:
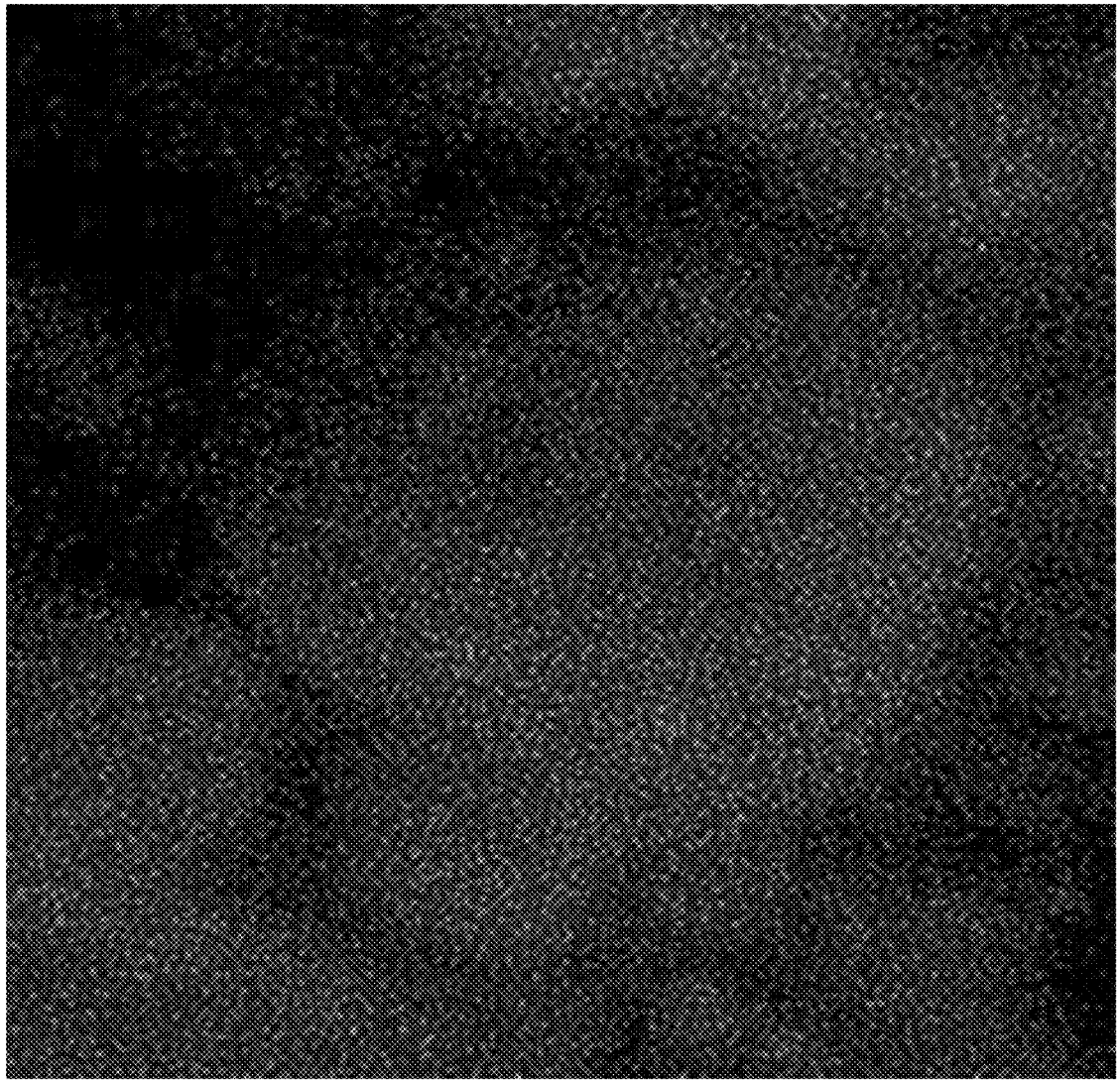
FIG. 2B shows the image of FIG. 2A with the $ZrO_2$ material highlighted as light regions.
Figure 3:
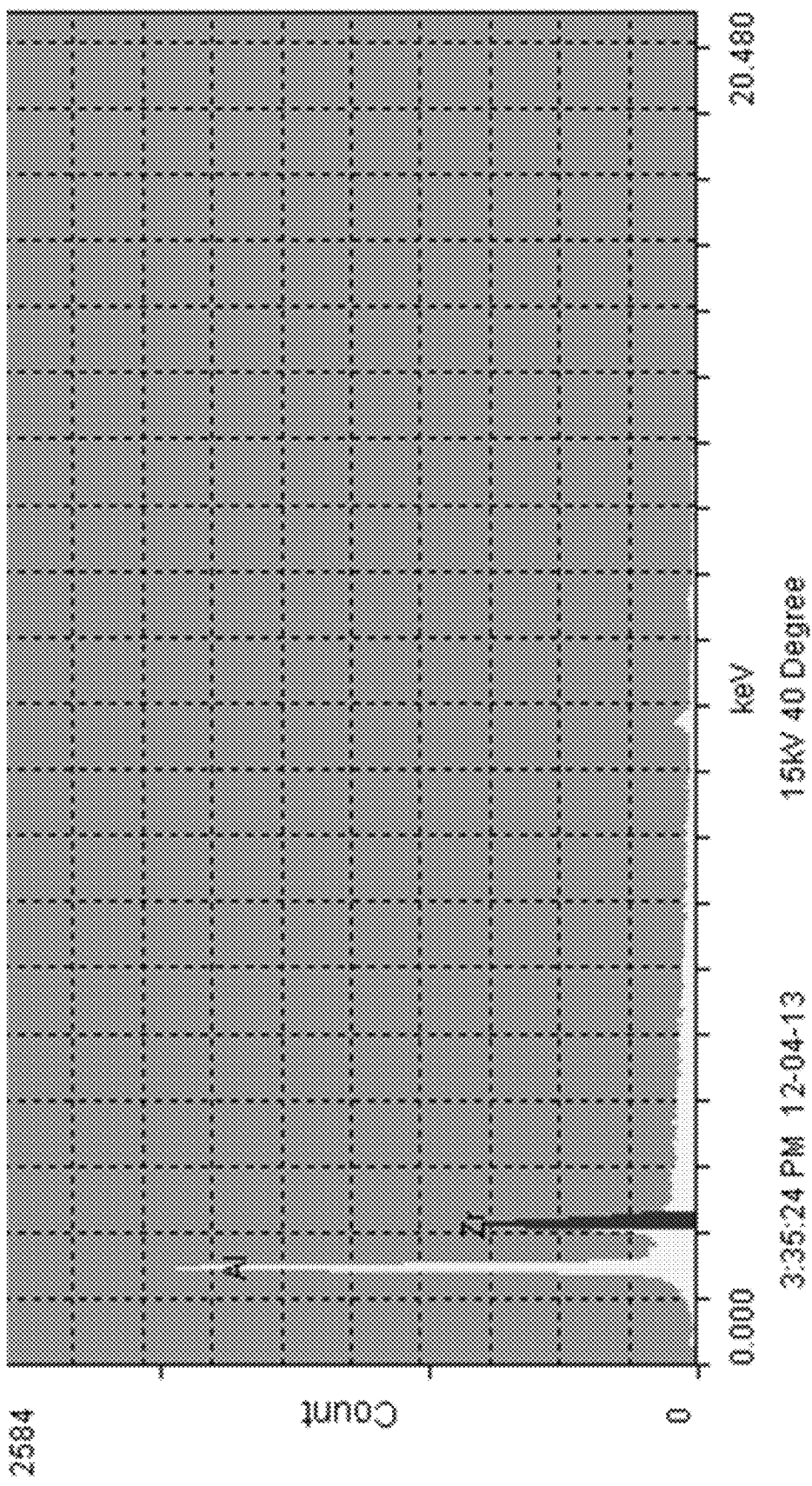
FIG. 3 shows an Energy Dispersive X-Ray Spectroscopy (EDX) spectrum for the material shown in FIGS. 2A and 2B.

A $LiAlO_2$ powder was obtained by heat treating a spray dried mixture prepared from an aqueous slurry containing $Zr(OH)_4$, $Al_2O_3$, and $Li_2O_3$ at a temperature of 680° C. to 850° C. for between 12 hours and 30 hours. An X-Ray Diffraction (XRD) pattern of the powder is shown in FIG. 1, and demonstrates that the powder includes both $LiAlO_2$ and $ZrO_2$ phases. A Scanning Electron Microscope (SEM) image of the powder is shown in FIG. 2A, and a modified SEM image highlighting $ZrO_2$ is shown in FIG. 2B. As shown in FIG. 3, an Energy Dispersive X-Ray Spectroscopy (EDX) spectrum demonstrates that $ZrO_2$ powder is uniformly distributed within the $LiAlO_2$ support material.

A matrix support material ($LiAlO_2$) was mixed with an $MO_2$ coarsening inhibitor additive (M=Zr, Mn, Ti or Fe) and $Li_2CO_3$ and milled together to achieve the desired average particle size. The milling/mixing was performed in a solvent, such as MEK or a mixture of MEK and cyclohexane with 1 to 5 wt % of fish oil to prevent re-agglomeration of particles. An attrition milling technique using a grinding media having 0.3 mm to 3 mm ball size was used to mill the mixture of $LiAlO_2$, $MO_2$ and $Li_2CO_3$. The grinding media loading varied between 60% and 80% and the grinding speed was between 2000 rpm and 3000 rpm. After achieving the desired particle size, aluminum particles were added to the milled mixture of $LiAlO_2$, $Li_2CO_3$ and $MO_2$. The amount of $MO_2$ additive was between 0.1 vol. % and 40 vol. %, with an amount between 0.1 vol. % and 10 vol. % achieving the desirable results in terms of particle coarsening reduction.

In the next step, additives, including a binder and a plasticizer, were added to the slurry. In this example, approximately 19 wt. % to 21 wt. % of Acryloid binder and Santicizer® 160 plasticizer were used as the additives. The slurry was then tape cast using a doctor blade and dried at a temperature between 25° C. and 30° C. for a time of 30 minutes to 50 minutes to form green sheets. The green sheets were then laminated and tested in single cells for a performance and life stability evaluation.

Several bench-scale, single cells (250 $cm^2$) were tested to determine the performance and stability of the electrolyte matrix. Each single cell assembly included a porous Ni—Al and/or Ni—Cr anode and a porous in-situ oxidized and lithiated NiO cathode, separated by the electrolyte matrix. A comparative example included an electrolyte matrix that of $LiAlO_2$ in the absence of a coarsening inhibitor additive. The cathode (250 $cm^2$) was filled with an appropriate amount of Li/K or Li/Na electrolyte and an appropriate amount of Li/Na or Li/k electrolyte was also stored in the cathode current collector to achieve the necessary electrolyte balance.

Figure 4:
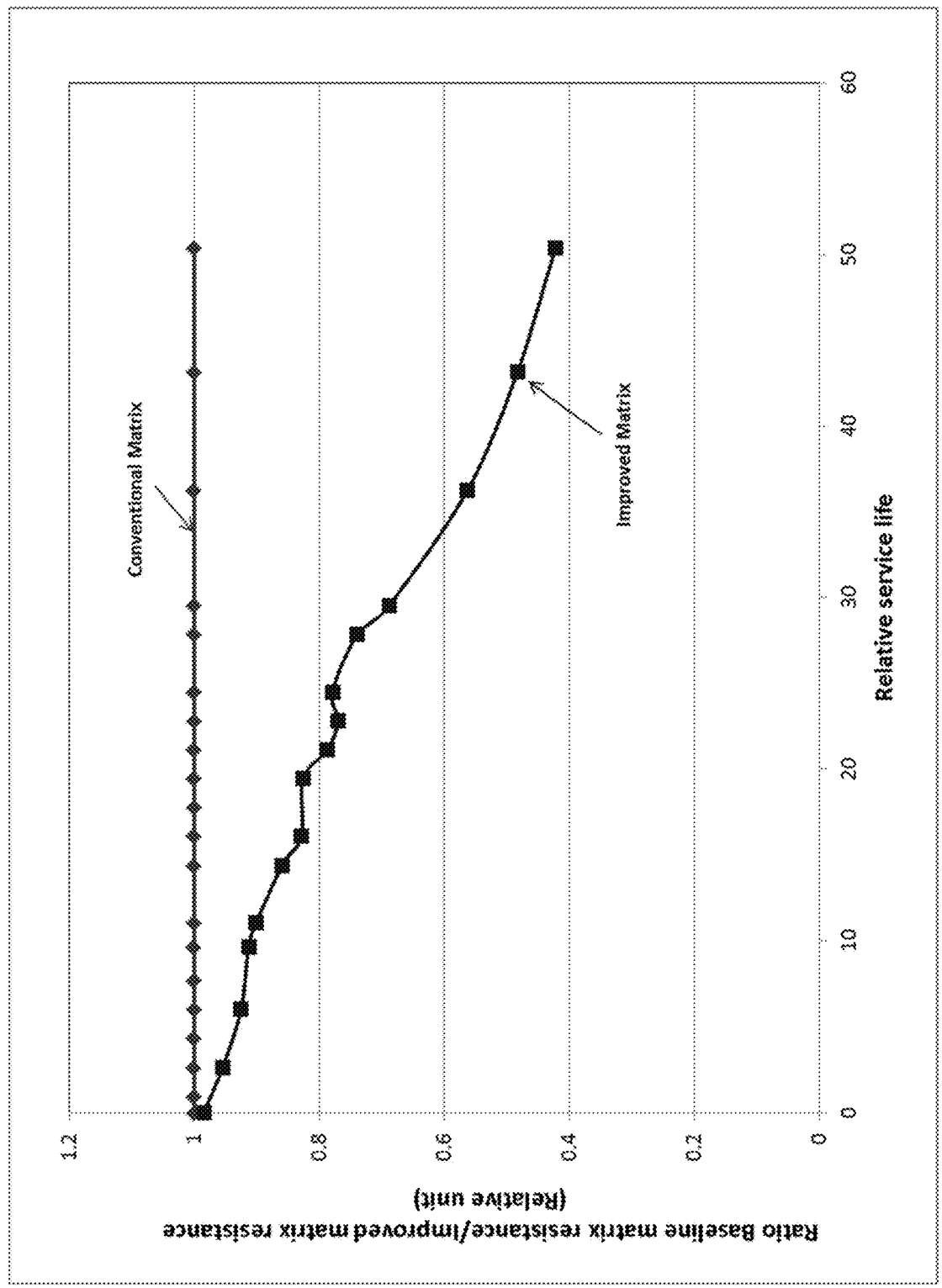
FIG. 4 shows the variation of the resistance of a matrix of the present invention relative to a conventional matrix as a function of service life.

The anode gas for the test was 72.8% $H_2$-18.2% $CO_2$-9% $H_2O$ and the cathode gas was 18.5% $CO_2$-12.1% $O_2$-66.4% $N_2$-3% $H_2O$. Tests were performed under accelerated conditions in terms of temperatures (665° C.) and fuel utilization (80%). Cell resistance, voltage and gas cross-over stability were monitored with the passage of time to evaluate the performance and stability of the electrolyte matrix. The tests were performed at 160 $mA/cm^2$. FIG. 4 shows the resistance stability comparison between the comparative electrolyte matrix and the electrolyte matrix of the present invention. The inventive electrolyte matrix exhibited greater than 40% improved resistance stability compared to the comparative electrolyte matrix. The improvement may be due to fewer large pores being formed in the matrix and a more stable pore structure as revealed by post-test analysis. The presence of metal oxide additives eliminated the formation of large pores (>0.2 μm) by reducing/eliminating the coarsening of the matrix particles, which helps to maintain stable capillary force for electrolyte retention.

Figure 5:
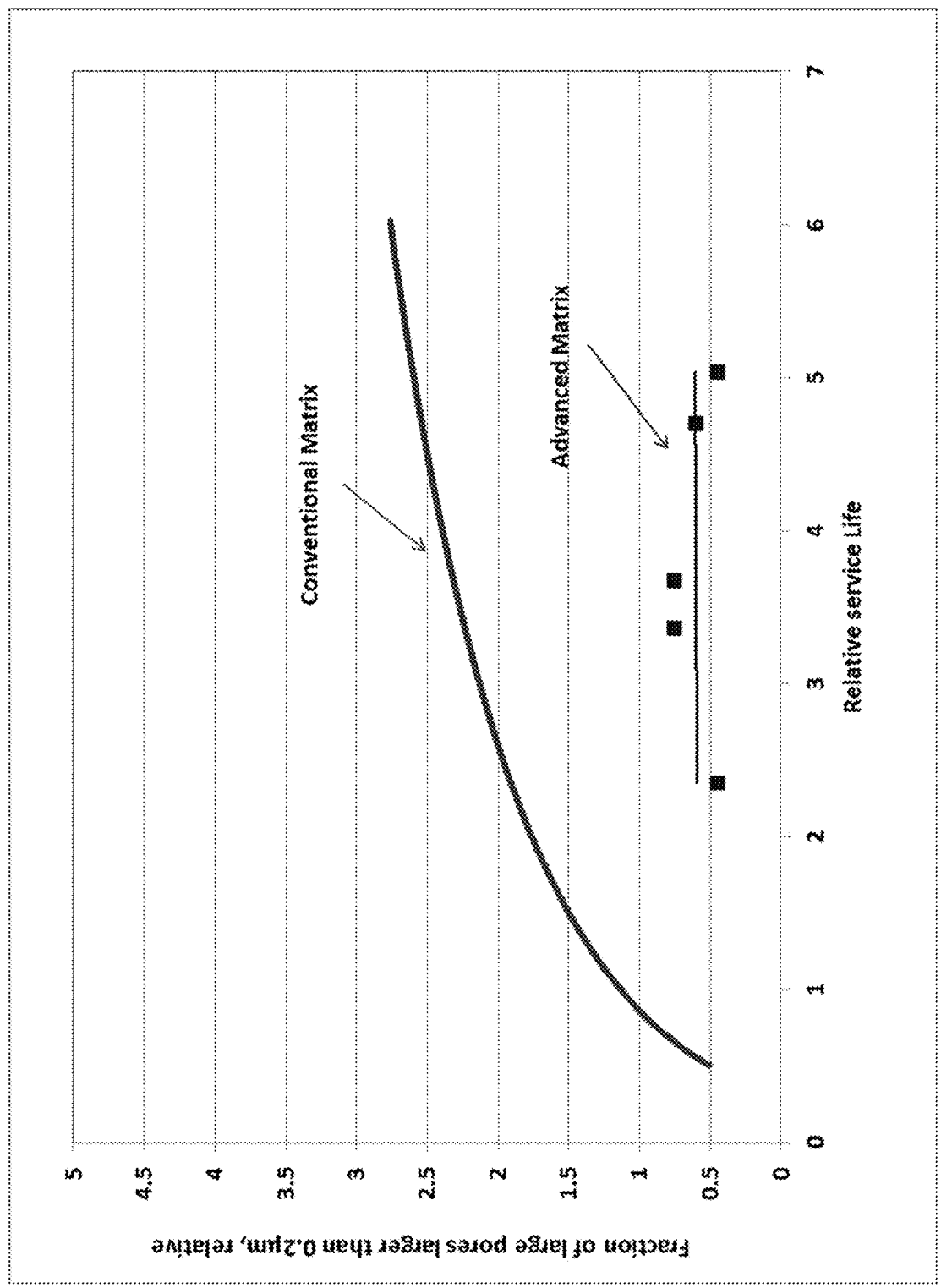
FIG. 5 shows the fraction of large pores, greater than 0.2 μm, present in a matrix of the present invention and a conventional matrix as a function of service life.

In order to evaluate the benefit of the inventive matrix, post-test analysis were performed on single cells to determine the fraction of large pores present in the matrix. FIG. 5 shows an example of the large pore fraction (>0.2 μm) comparison at the end of life between the conventional matrix and the inventive matrix. These results demonstrate that the inventive matrix exhibits a smaller population of large pores and more stable pore structure over time in comparison to conventional matrices. The inventive matrix shows a >60% reduction in the population of large pores (>0.2 μm), confirming the superiority of the inventive matrix over the conventional design.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or resequenced according to alternative embodiments. Other substitutions, modifications, changes and omissions may also be made in the design, operating conditions and arrangement of the various exemplary embodiments without departing from the scope of the present invention. For example, the heat recovery heat exchangers may be further optimized.

What is claimed is:

1. A method of making an electrolyte matrix comprising:
    preparing a slurry comprising:
        a support material comprising lithium aluminate,
        a coarsening inhibitor comprising a material selected from the group consisting of $MnO_2$, $Mn_2O_3$, $TiO_2$, $ZrO_2$, $Fe_2O_3$, $LiFe_2O_3$, and mixtures thereof, wherein the coarsening inhibitor has a particle size of about 0.005 µm to about 0.5 µm, and wherein the coarsening inhibitor has a BET surface area of about 10 m²/g to about 50 m²/g,
        an electrolyte material,
        a reinforcing material having an average particle size in a range of about 10 µm to about 120 µm, and
        a solvent; and
    drying the slurry to form an electrolyte matrix.

2. The method of claim 1, wherein preparing the slurry comprises an attrition milling process that reduces the size of the materials in the slurry.

3. The method of claim 1, further comprising tape casting the slurry before drying the slurry.

4. The method of claim 1, further comprising adding a binder, a plasticizer, or a combination thereof to the slurry.

5. The method of claim 1, wherein the coarsening inhibitor is present in an amount of about 0.1 vol. % to about 40 vol. % of dry components of the slurry.

6. A method of making an electrolyte matrix comprising:
    forming a mixture of an aluminum containing precursor, a lithium containing precursor, and a dopant precursor, wherein the dopant precursor is in oxide or salt form;
    drying the mixture to form a powder;
    heat treating the powder at a temperature of about 550° C. to about 800° C. for a period of about 6 hours to about 30 hours to form a lithium aluminate including a dopant, wherein the dopant comprises a material selected from the group consisting of $MnO_2$, $Mn_2O_3$, $TiO_2$, $ZrO_2$, $Fe_2O_3$, $LiFe_2O_3$ and mixtures thereof;
    preparing a slurry comprising the lithium aluminate including the dopant, an electrolyte material, and a solvent; and
    drying the slurry to form an electrolyte matrix.

7. The method of claim 6, wherein the dopant precursor comprises $MnO_2$, $TiO_2$, $ZrO_2$, $Fe_2O_3$, or mixtures thereof.

8. The method of claim 6, wherein the aluminum precursor comprises $Al_2O_3$.

9. The method of claim 6, wherein the lithium precursor comprises lithium carbonate.

10. The method of claim 6, further comprising tape casting the slurry before drying the slurry.

11. The method of claim 6, further comprising adding a binder, a plasticizer, a reinforcing material, or a combination thereof to the slurry.

12. The method of claim 6, wherein the lithium aluminate including a dopant comprises the dopant in an amount of about 0.1 mol. % to about 15 mol. %.

13. The method of claim 1, wherein the coarsening inhibitor is provided as a dopant within the support material.

* * * * *